United States Patent
Eybergen

(10) Patent No.: US 9,587,521 B2
(45) Date of Patent: Mar. 7, 2017

(54) VOLUMETRIC ENERGY RECOVERY DEVICE AND SYSTEMS

(71) Applicant: EATON CORPORATION, Cleveland, OH (US)

(72) Inventor: William Nicholas Eybergen, Macomb County, MI (US)

(73) Assignee: Eaton Corporation, Cleveland, OH (US)

( * ) Notice: Subject to any disclaimer, the term of this patent is extended or adjusted under 35 U.S.C. 154(b) by 155 days.

(21) Appl. No.: 14/382,042

(22) PCT Filed: Feb. 28, 2013

(86) PCT No.: PCT/US2013/028273
§ 371 (c)(1),
(2) Date: Aug. 29, 2014

(87) PCT Pub. No.: WO2013/130774
PCT Pub. Date: Sep. 6, 2013

(65) Prior Publication Data
US 2015/0007569 A1  Jan. 8, 2015

Related U.S. Application Data

(60) Provisional application No. 61/604,929, filed on Feb. 29, 2012.

(51) Int. Cl.
*F01K 23/06*  (2006.01)
*F01K 23/10*  (2006.01)
(Continued)

(52) U.S. Cl.
CPC ............. *F01K 23/10* (2013.01); *F01C 13/04* (2013.01); *F01K 7/36* (2013.01); *F01K 25/08* (2013.01); *F01C 1/16* (2013.01)

(58) Field of Classification Search
CPC .. F01C 13/04; F01C 1/16; F01K 23/10; F01K 25/08; F01K 7/36
See application file for complete search history.

(56) References Cited

U.S. PATENT DOCUMENTS 8,196,686 B2   6/2012 Grieve
2003/0172654 A1   9/2003 Lawheed
(Continued)

FOREIGN PATENT DOCUMENTS

EP   1 925 776 A1   5/2008
GB   1 301 214 A   12/1972
(Continued)

OTHER PUBLICATIONS

International Search Report for corresponding International Patent Application PCT/US2013/028273 mailed May 10, 2013.

*Primary Examiner* — Jesse Bogue
(74) *Attorney, Agent, or Firm* — Merchant & Gould P.C.

(57) ABSTRACT

A volumetric expander (20) configured to transfer a working fluid and generate useful work includes a housing. The housing includes an inlet port (24) configured to admit relatively high-pressure working fluid and an outlet port (26) configured to discharge to a relatively low-pressure working fluid. The expander also includes first and second twisted meshed rotors (30,32) rotatably disposed in the housing and configured to exp/and the relatively high-pressure working fluid into the relatively low-pressure working fluid. Each rotor has a plurality of lobes, and when one lobe of the first rotor is leading with respect to the inlet port, one lobe of the second rotor is trailing with respect to the inlet port. The expander additionally includes an output shaft (38) rotated by the relatively high-pressure working fluid as the fluid undergoes expansion. A system for generating work using the expander in a Rankine cycle is also disclosed.

22 Claims, 10 Drawing Sheets

(51) Int. Cl.
*F01K 7/36* (2006.01)
*F01K 25/08* (2006.01)
*F01C 13/04* (2006.01)
*F01C 1/16* (2006.01)

(56) References Cited

U.S. PATENT DOCUMENTS

| | | | |
|---|---|---|---|
| 2008/0134680 A1* | 6/2008 | Oser | F01K 25/065 60/649 |
| 2009/0188253 A1* | 7/2009 | Smith | F01C 1/16 60/657 |
| 2010/0055517 A1* | 3/2010 | Uzhinsky | C01B 3/065 429/495 |
| 2010/0155157 A1 | 6/2010 | Grieve | |
| 2010/0209259 A1* | 8/2010 | Kawamura | C23C 16/4412 417/12 |
| 2011/0067395 A1 | 3/2011 | Suhocki | |
| 2011/0094480 A1 | 4/2011 | Suhocki et al. | |
| 2011/0175358 A1* | 7/2011 | Langson | F03G 7/04 290/52 |
| 2012/0007371 A1* | 1/2012 | Konrad | H01M 8/04014 290/1 R |
| 2012/0020824 A1* | 1/2012 | Huang | F01C 1/086 418/157 |
| 2012/0036850 A1* | 2/2012 | Ernst | F01K 23/065 60/615 |

FOREIGN PATENT DOCUMENTS

| | | |
|---|---|---|
| GB | 2 427 002 A | 12/2006 |
| WO | WO 02/090747 A2 | 11/2002 |

* cited by examiner

VOLUMETRIC ENERGY RECOVERY DEVICE AND SYSTEMS

RELATED APPLICATIONS

This application is a National Stage Application of PCT/US2013/028273, filed 28 Feb. 2013, which claims benefit of U.S. patent application Ser. No. 61/604,929 filed on 29 Feb. 2012, and which applications are incorporated herein by reference. To the extent appropriate, a claim of priority is made to each of the above disclosed applications.

TECHNICAL FIELD

The present disclosure relates to a volumetric fluid expander used for power generation in the Rankine cycle.

BACKGROUND

The Rankine cycle is a power generation cycle that converts thermal energy to mechanical work. The Rankine cycle is typically used in heat engines, and accomplishes the above conversion by bringing a working substance from a higher temperature state to a lower temperature state. The classical Rankine cycle is the fundamental thermodynamic process underlying the operation of a steam engine.

In the Rankine cycle a heat "source" generates thermal energy that brings the working substance to the higher temperature state. The working substance generates work in the "working body" of the engine while transferring heat to the colder "sink" until the working substance reaches the lower temperature state. During this process, some of the thermal energy is converted into work by exploiting the properties of the working substance. The heat is supplied externally to the working substance in a closed loop, wherein the working substance is a fluid that has a non-zero heat capacity, which may be either a gas or a liquid, such as water. The efficiency of the Rankine cycle is usually limited by the working fluid.

The Rankine cycle typically employs individual subsystems, such as a condenser, a fluid pump, a heat exchanger such as a boiler, and an expander turbine. The pump is frequently used to pressurize the working fluid that is received from the condenser as a liquid rather than a gas. Typically, all of the energy is lost in pumping the working fluid through the complete cycle, as is most of the energy of vaporization of the working fluid in the boiler. This energy is thus lost to the cycle mainly because the condensation that can take place in the turbine is limited to about 10% in order to minimize erosion of the turbine blades, while the vaporization energy is rejected from the cycle through the condenser. On the other hand, the pumping of the working fluid through the cycle as a liquid requires a relatively small fraction of the energy needed to transport the fluid as compared to compressing the fluid as a gas in a compressor.

A variation of the classical Rankine cycle is the Organic Rankine cycle (ORC), which is named for its use of an organic, high molecular mass fluid, with a liquid-vapor phase change, or boiling point, occurring at a lower temperature than the water-steam phase change. As such, in place of water and steam of the classical Rankine cycle, the working fluid in the ORC may be a solvent, such as n-pentane or toluene. The ORC working fluid allows Rankine cycle heat recovery from lower temperature sources such as biomass combustion, industrial waste heat, geothermal heat, solar ponds, etc. The low-temperature heat may then be converted into useful work, which may in turn be converted into electricity.

SUMMARY

A volumetric or positive displacement expander configured to transfer a working fluid and generate useful work includes a housing. The housing includes an inlet port configured to admit relatively high-pressure working fluid and an outlet port configured to discharge relatively low-pressure working fluid. The expander also includes first and second twisted meshed rotors rotatably disposed in the housing and configured to expand the relatively high-pressure working fluid into the relatively low-pressure working fluid. Each rotor has a plurality of lobes, and when one lobe of the first rotor is leading with respect to the inlet port, one lobe of the second rotor is trailing with respect to the inlet port. The expander additionally includes an output shaft configured to be rotated by the relatively high-pressure working fluid as the working fluid undergoes expansion.

Another embodiment of the disclosure is directed to a system used to generate useful work via a closed-loop Rankine cycle, wherein the system includes the volumetric expander described above.

Yet another embodiment of the disclosure is directed to a vehicle including a power-plant and employing the above system to augment the power generated by the power-plant.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
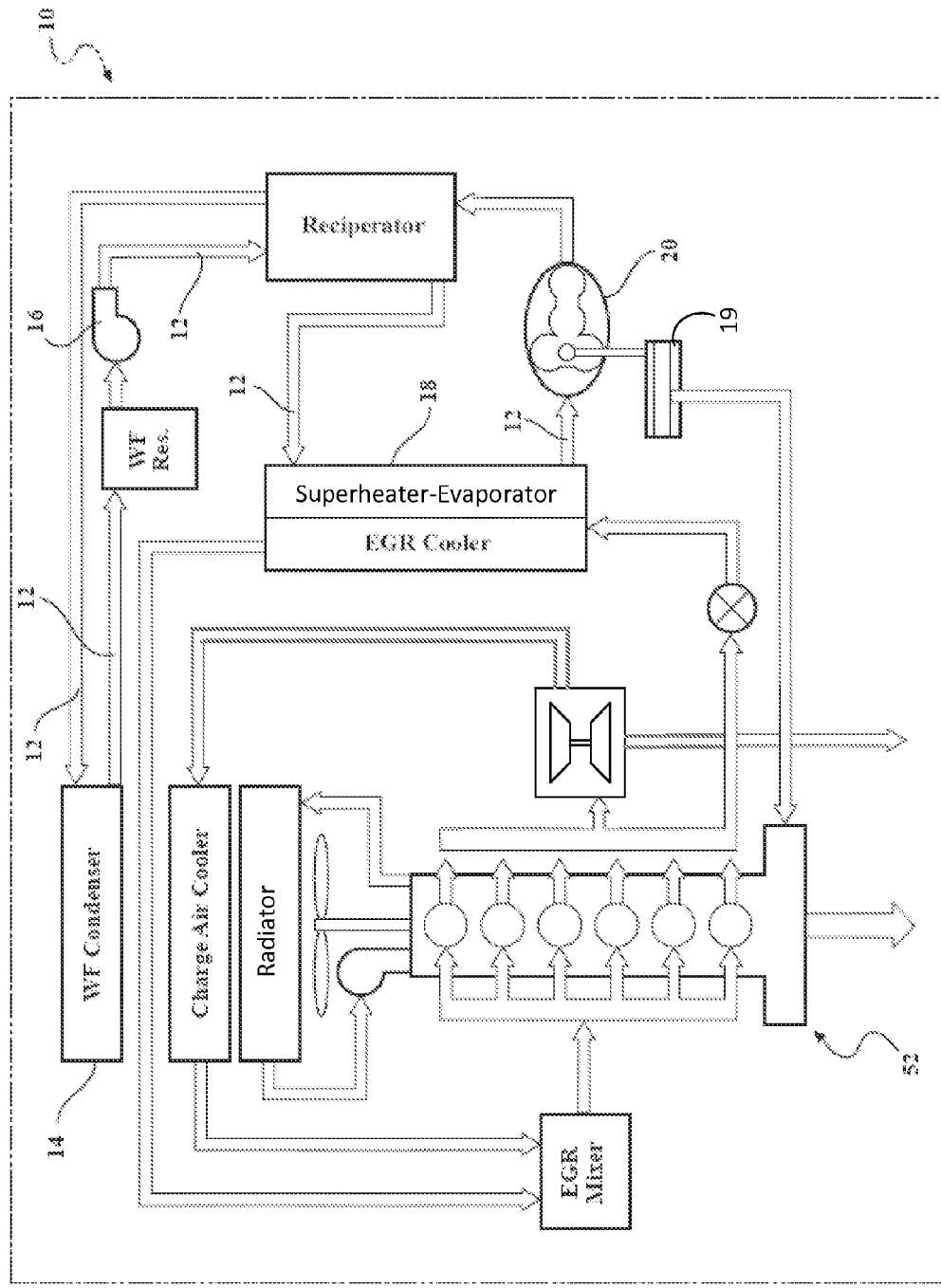
FIG. 1 is a schematic depiction of a system employing a Rankine cycle for generating useful work and having features that are examples of aspects in accordance with the principles of the present disclosure.

Referring to the drawings wherein like reference numbers correspond to like or similar components throughout the several figures. FIGS. 1-10 illustrate a system in which a volumetric energy recovery device 20 having dual interleaved twisted rotors extracts energy from a waste heat stream from a power source that would otherwise be wasted, such as an exhaust air stream from an internal combustion engine 52. As configured, the volumetric energy recovery device 20 returns the extracted energy back to the engine 52 via an output shaft 38 of the device 20. In one embodiment, a gear reducer 19 is utilized to transfer energy between the output shaft 38 and a power input location of the engine 52, such as the engine drive shaft. Accordingly, the volumetric energy recovery device 20 operates to increase the overall efficiency of the engine 52.

In some embodiments, an intermediate working fluid 12-1 is utilized to transfer energy between the engine exhaust and the device 20. Referring to FIG. 1, a system 10 is schematically presented in which the working fluid 12-1 is utilized in a Rankine cycle. Generally, the Rankine cycle uses a working substance, typically a fluid, in a closed loop to operate power generation systems and heat engines for converting thermal energy to mechanical work. In the Rankine cycle a heat "source" generates thermal energy that brings the working substance to an elevated temperature state. The working substance generates work in the "working body" of the heat engine while transferring thermal energy to the colder "sink" until the working substance reaches the lower temperature state. During this process, some of the thermal energy is converted into mechanical work by exploiting the properties of the working substance.

As shown schematically in FIG. 1, the system 10 employs a working fluid 12 as the working substance for closed loop circulation while using the Rankine cycle to generate mechanical work. The system 10 includes a condenser 14 configured to compress or condense the working fluid 12. The system 10 also includes a fluid pump 16. The pump 16 is configured to receive the working fluid 12 from the condenser 14 and pressurize the condensed working fluid 12. The system 10 also includes a heat exchanger 18. The heat exchanger 18 is configured to receive the working fluid 12 from the pump 16 and boil the working fluid. The system 10 additionally includes a volumetric rotary expansion device or expander 20. The expander 20 is configured to receive the working fluid 12 from the heat exchanger 18, generate the work, and complete the loop in the Rankine cycle by transferring the working fluid back to the condenser 14.

Volumetric Energy Recovery Device—General

In general, the volumetric energy recovery device 20 relies upon the kinetic energy and static pressure of the working fluid 12-1 to rotate an output shaft 38. Where the device 20 is used in an expansion application, such as with a Rankine cycle, additional energy is extracted from the working fluid via fluid expansion. In such instances, device 20 may be referred to as an expander or expansion device, as so presented in the following paragraphs. However, it is to be understood that the device 20 is not limited to applications where a working fluid is expanded across the device.

The expansion device 20 has a housing 22 with a fluid inlet 24 and a fluid outlet 26 through which the working fluid 12-1 undergoes a pressure drop to transfer energy to the output shaft 38. The output shaft 38 is driven by synchronously connected first and second interleaved counter-rotating rotors 30, 32 which are disposed in a cavity 28 of the housing 22. Each of the rotors 30, 32 has lobes that are twisted or helically disposed along the length of the rotors 30, 32. Upon rotation of the rotors 30, 32, the lobes at least partially seal the working fluid 12-1 against an interior side of the housing at which point expansion of the working fluid 12-1 only occurs to the extent allowed by leakage which represents and inefficiency in the system. In contrast to some expansion devices that change the volume of the working fluid when the fluid is sealed, the volume defined between the lobes and the interior side of the housing 22 of device 20 is constant as the working fluid 12-1 traverses the length of the rotors 30, 32. Accordingly, the expansion device 20 may be referred to as a "volumetric device" as the sealed or partially sealed working fluid volume does not change. It is noted that, and as will be clear to one skilled in the art upon learning of this disclosure, the described geometry and construction of the expander 20 is dissimilar from the geometry and construction of a typical roots-type compressor.

Figure 2:
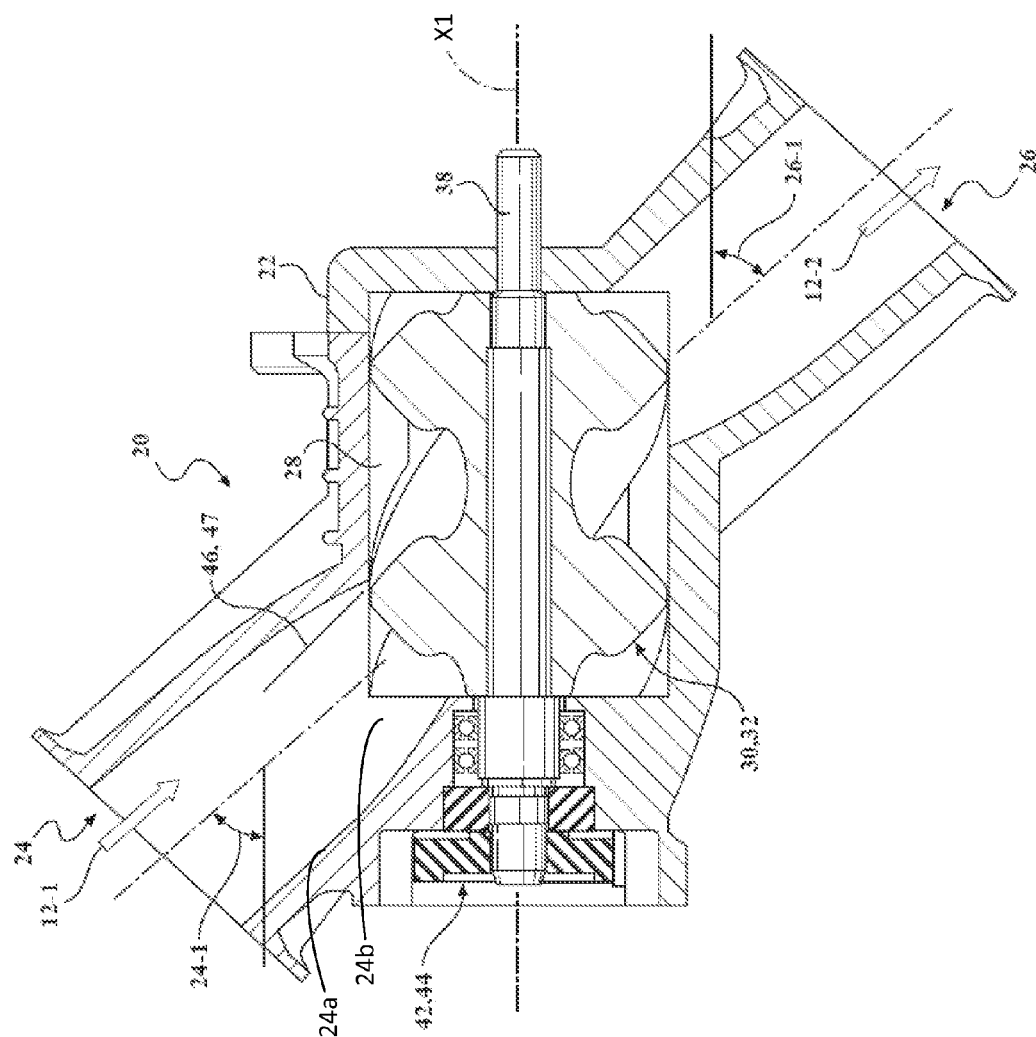
FIG. 2 is a schematic perspective top view of an expander used in the system shown in FIG. 1.
Figure 3:
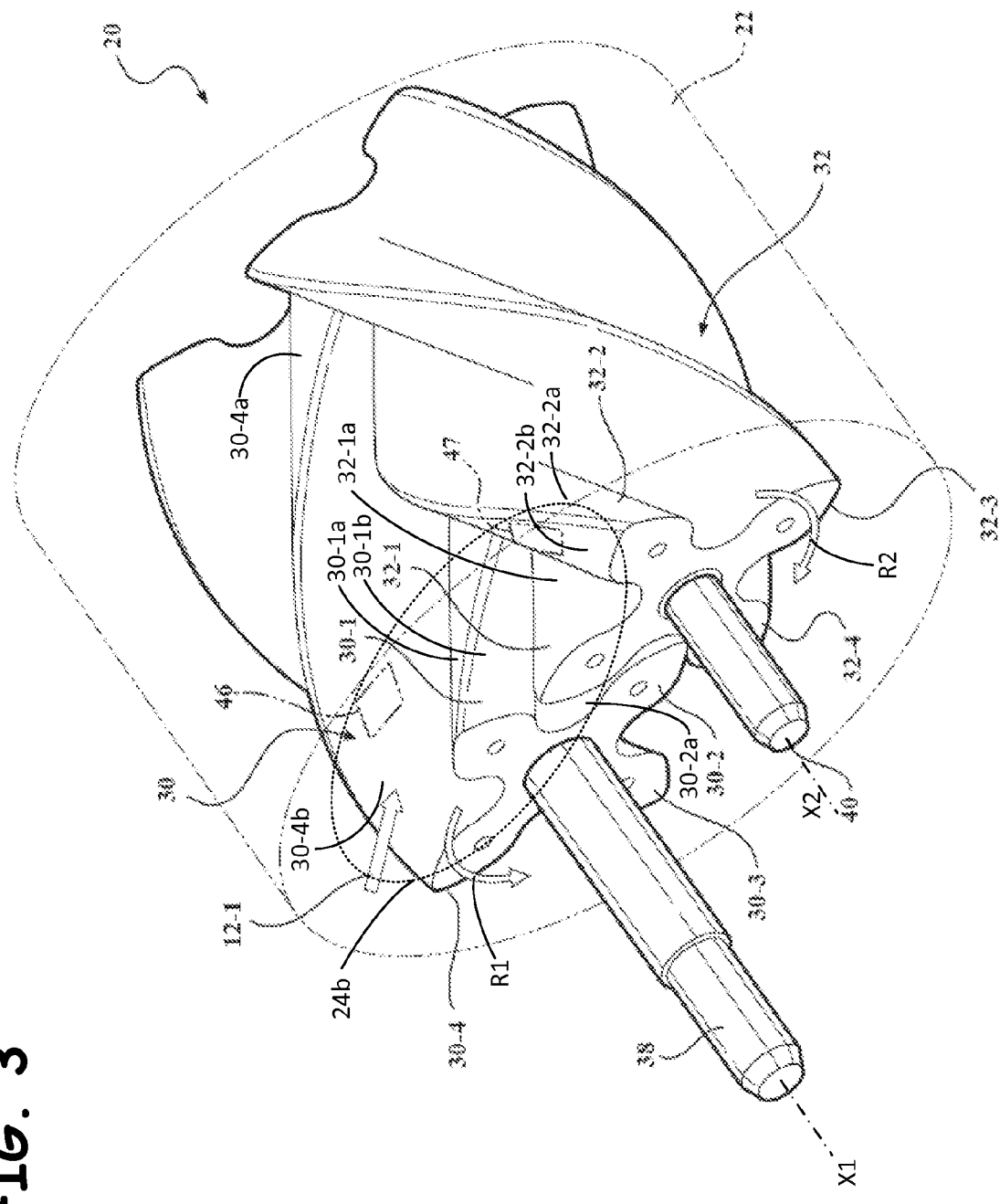
FIG. 3 is a schematic cross-sectional side view of the expander shown in FIG. 2.
Figure 8:
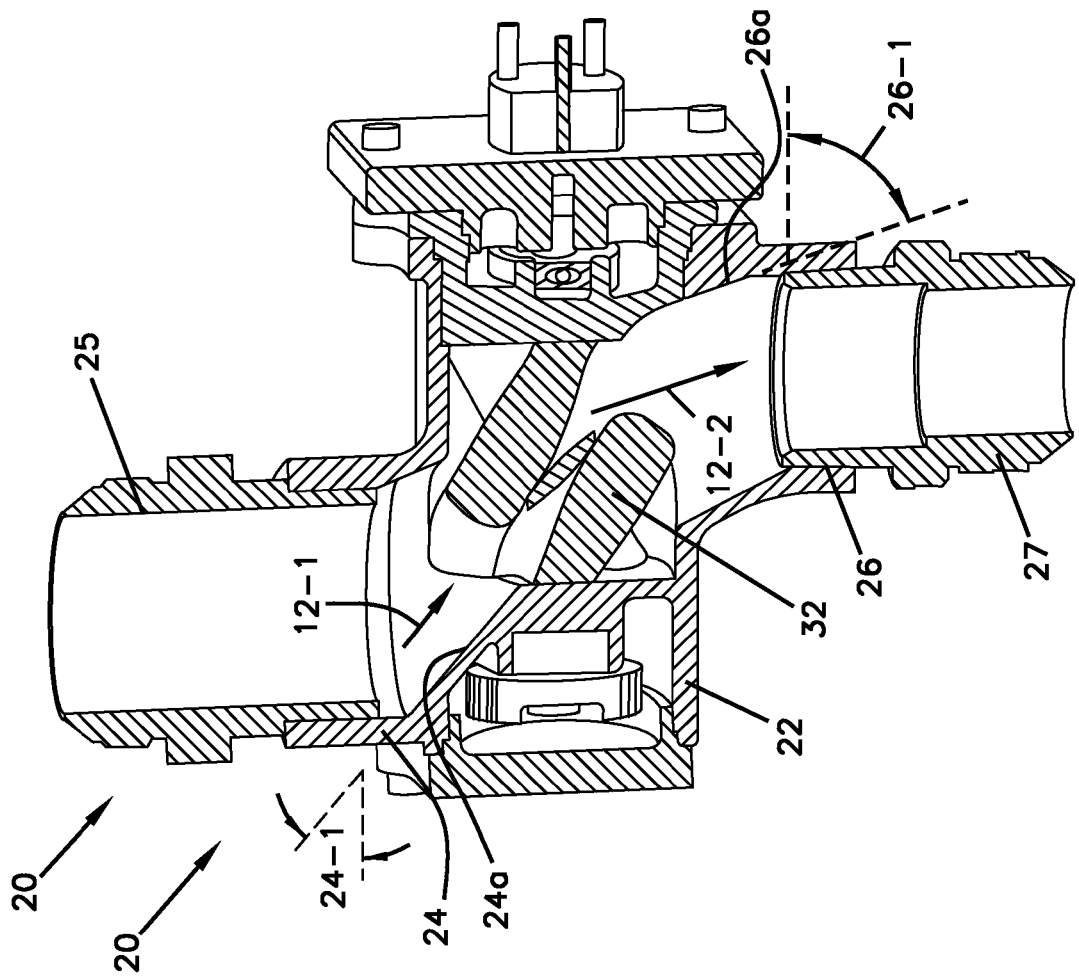
FIG. 8 is a cross-sectional view of the expander shown in FIG. 7 taken along the axial centerline of the expander.
Figure 9:
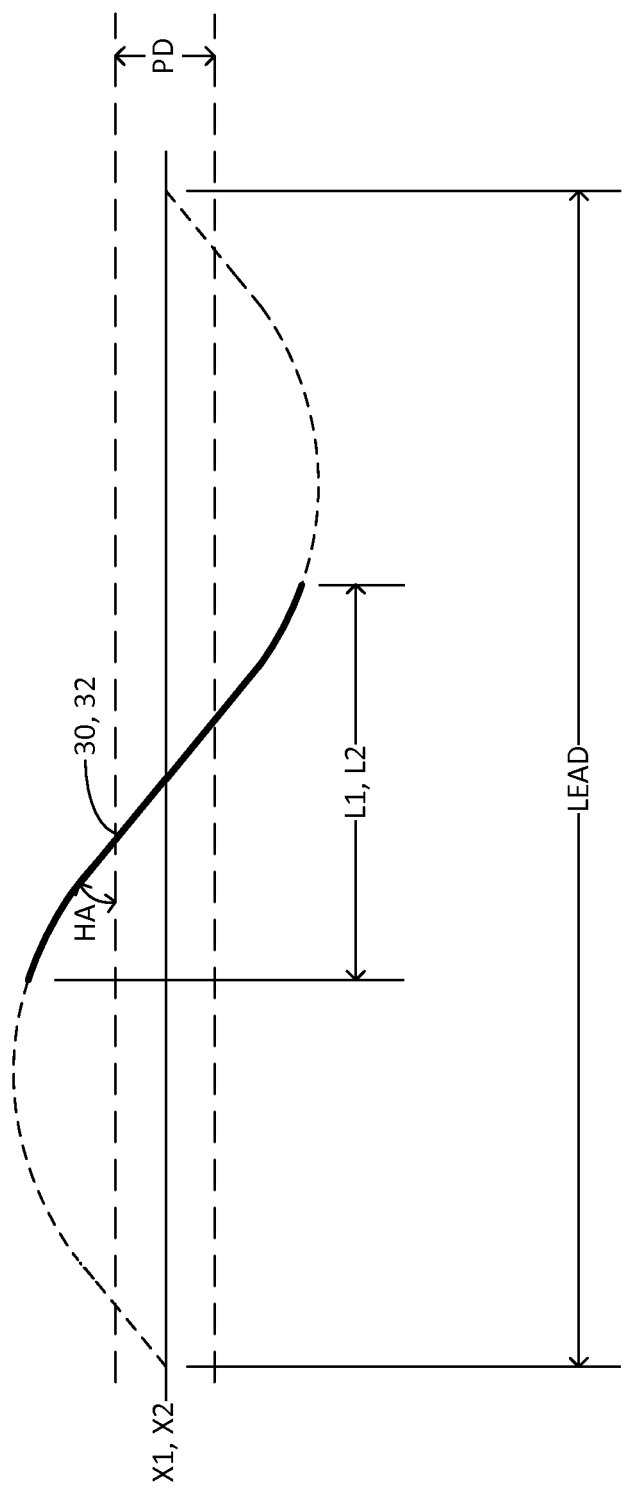
FIG. 9 is a schematic showing geometric parameters of the rotors of the expander shown in FIG. 7.

The expander 20 is shown in detail in FIGS. 2 and 3. The expander 20 includes a housing 22. As shown in FIG. 2, the housing 22 includes an inlet port 24 configured to admit relatively high-pressure working fluid 12-1 from the heat exchanger 18 (shown in FIG. 1). The housing 22 also includes an outlet port 26 configured to discharge working fluid 12-2 to the condenser 14 (shown in FIG. 1). It is noted that the working fluid discharging from the outlet 26 is at a relatively higher pressure than the pressure of the working fluid at the condenser 14. Referring to FIG. 8, the inlet and outlet ports 24, 26 may be provided with connectors 25, 27, respectively, for providing a fluid tight seal with other system components to ensure the working fluid 12-1, 12-2, which may be ethanol, does not dangerously leak outside of the expander 20.

As additionally shown in FIG. 3, each rotor 30, 32 has four lobes, 30-1, 30-2, 30-3, and 30-4 in the case of the rotor 30, and 32-1, 32-2, 32-3, and 32-4 in the case of the rotor 32. Although four lobes are shown for each rotor 30 and 32, each of the two rotors may have any number of lobes that is equal to or greater than two, as long as the number of lobes is the same for both rotors. Accordingly, when one lobe of the rotor 30, such as the lobe 30-1 is leading with respect to the inlet port 24, a lobe of the rotor 32, such as the lobe 30-2, is trailing with respect to the inlet port 24, and, therefore with respect to a stream of the high-pressure working fluid 12-1.

As shown, the first and second rotors 30 and 32 are fixed to respective rotor shafts, the first rotor being fixed to an output shaft 38 and the second rotor being fixed to a shaft 40. Each of the rotor shafts 38, 40 is mounted for rotation on a set of bearings (not shown) about an axis X1, X2, respectively. It is noted that axes X1 and X2 are generally parallel to each other. The first and second rotors 30 and 32 are interleaved and continuously meshed for unitary rotation with each other. With renewed reference to FIG. 2, the expander 20 also includes meshed timing gears 42 and 44, wherein the timing gear 42 is fixed for rotation with the rotor 30, while the timing gear 44 is fixed for rotation with the rotor 32. The timing gears 42, 44 are configured to retain specified position of the rotors 30, 32 and prevent contact between the rotors during operation of the expander 20.

The output shaft 38 is rotated by the working fluid 12 as the working fluid undergoes expansion from the relatively high-pressure working fluid 12-1 to the relatively low-pressure working fluid 12-2. As may additionally be seen in both FIGS. 2 and 3, the output shaft 38 extends beyond the boundary of the housing 22. Accordingly, the output shaft 38 is configured to capture the work or power generated by the expander 20 during the expansion of the working fluid 12 that takes place in the rotor cavity 28 between the inlet port 24 and the outlet port 26 and transfer such work as output torque from the expander 20. Although the output shaft 38 is shown as being operatively connected to the first rotor 30, in the alternative the output shaft 38 may be operatively connected to the second rotor 32. The output shaft 38 can be coupled to the engine 52 such that the energy from the exhaust can be recaptured. As shown in FIG. 1, a gear reducer 19 is provided to provide a better match between rotational speeds of the engine 52 and the shaft 38.

Expander—Geometry

In one aspect of the geometry of the expander 20, each of the rotor lobes 30-1 to 30-4 and 32-1 to 32-4 has a lobe geometry in which the twist of each of the first and second rotors 30 and 32 is constant along their substantially matching length 34. As shown schematically at FIG. 9, one parameter of the lobe geometry is the helix angle HA. By way of definition, it should be understood that references hereinafter to "helix angle" of the rotor lobes is meant to refer to the helix angle at the pitch diameter PD (or pitch circle) of the rotors 30 and 32. The term pitch diameter and it's identification are well understood to those skilled in the gear and rotor art and will not be further discussed herein. As used herein, the helix angle HA can be calculated as follows: Helix Angle (HA)=(180/.pi.*arctan (PD/Lead)), wherein: PD=pitch diameter of the rotor lobes; and Lead = the lobe length required for the lobe to complete 360 degrees of twist. It is noted that the Lead is a function of the twist angle and the length L1, L2 of the lobes 30, 32, respectively. The twist angle is known to those skilled in the art to be the angular displacement of the lobe, in degrees, which occurs in "traveling" the length of the lobe from the rearward end of the rotor to the forward end of the rotor. As shown, the twist angle is about 120 degrees, although the twist angle may be fewer or more degrees, such as 160 degrees.

Figure 7:
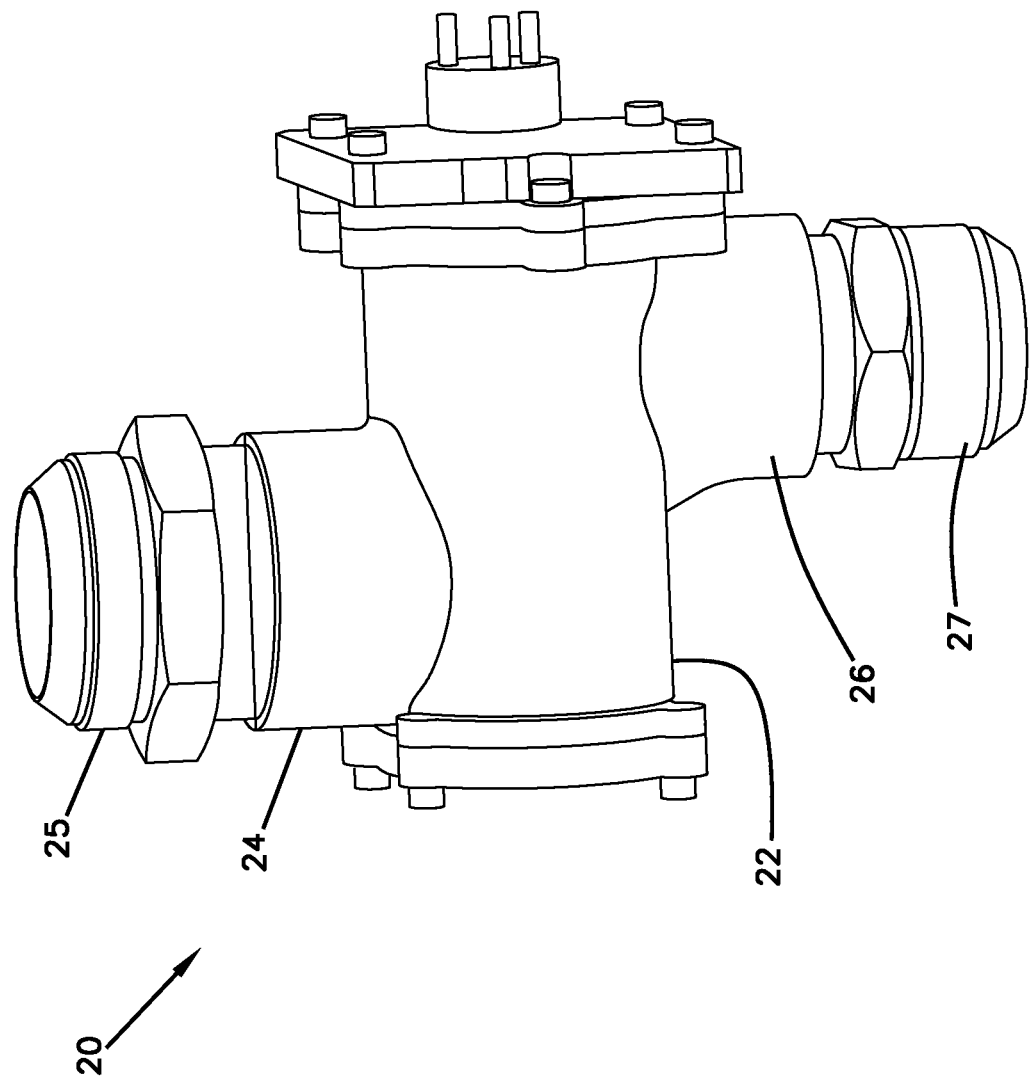
FIG. 7 is a side view of a configuration of an expander usable in the system shown in FIG. 1.

In another aspect of the expander geometry, the inlet port 24 includes an inlet angle 24-1, as can be seen schematically at FIG. 2, and in the embodiment shown at FIG. 7. In one embodiment, the inlet angle 24-1 is defined as the general or average angle of an inner surface 24a of the inlet port 24, for example an anterior inner surface as shown at FIG. 8. In one embodiment, the inlet angle 24-1 is defined as the angle of the general centerline of the inlet port 24, for example as shown at FIG. 2. In one embodiment, the inlet angle 24-1 is defined as the general resulting direction of the working fluid 12-1 entering the rotors 30, 32 due to contact with the anterior inner surface 24a, as can be seen at both FIGS. 2 and 8. As shown, the inlet angle 24-1 is neither perpendicular nor parallel to the rotational axes X1, X2 of the rotors 30, 32. Accordingly, the anterior inner surface 24a of the inlet port 24 causes a substantial portion of the working fluid 12-1 to be shaped in a direction that is at an oblique angle with respect to the rotational axes X1, X2 of the rotors 30, 32, and thus generally parallel to the inlet angle 24-1.

Figure 10:
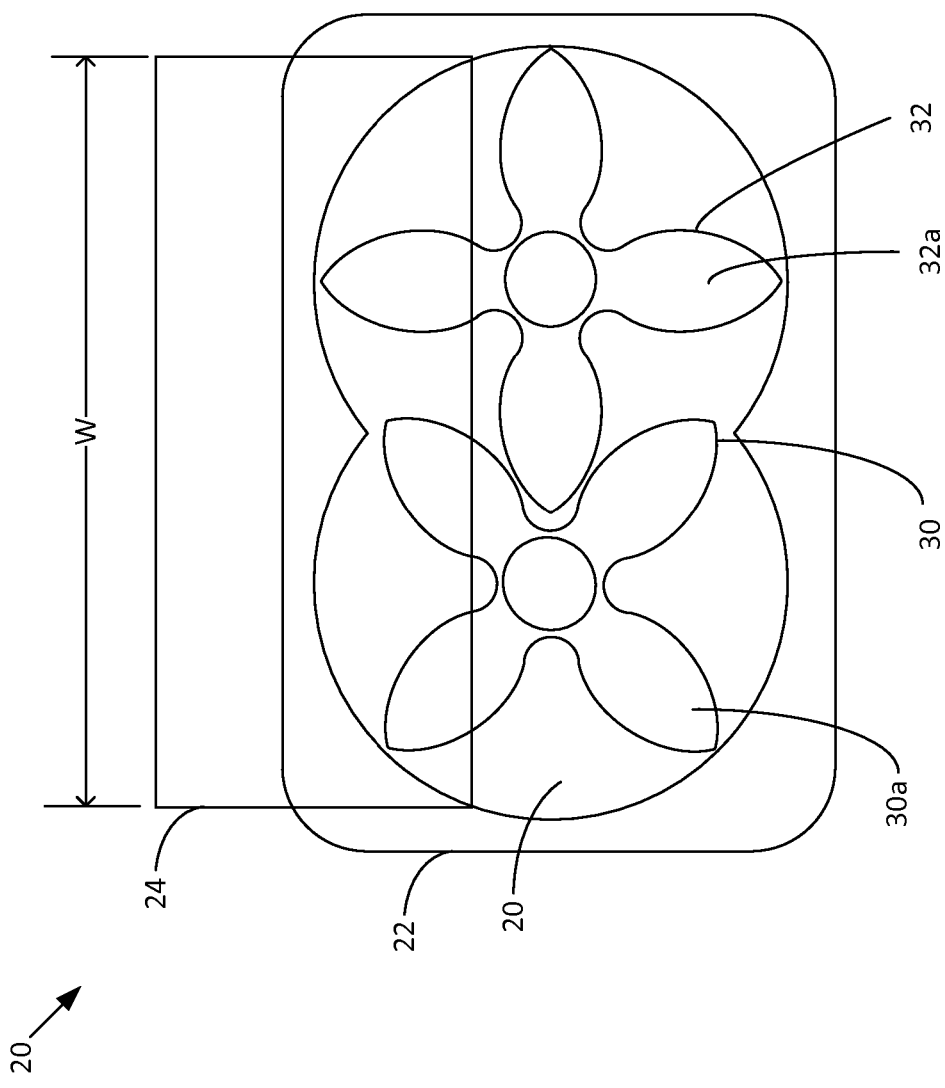
FIG. 10 is a schematic cross-sectional view of the expander shown in FIG. 7.

Furthermore, and as shown at both FIGS. 2 and 8, the inlet port 24 may be shaped such that the working fluid 12-1 is directed to the first axial ends 30a, 30b of the rotors 30, 32 and directed to the rotor lobe leading and trailing surfaces (discussed below) from a lateral direction. However, it is to be understood that the inlet angle 24-1 may be generally parallel or generally perpendicular to axes X1, X2, although an efficiency loss may be anticipated for certain rotor configurations. Furthermore, it is noted that the inlet port 24 may be shaped to narrow towards the inlet opening 24b, as shown in both FIGS. 2 and 8. Referring to FIG. 10, it can be seen that the inlet port 24 has a width W that is slightly less than the combined diameter distance of the rotors 30, 32. The combined rotor diameter is equal to the distance between the axes X1 and X2 plus the twice the distance from the centerline axis X1 or X2 to the tip of the respective lobe. In some embodiments, width W is the same as or more than the combined rotor diameter.

In another aspect of the expander geometry, the outlet port 26 includes an outlet angle 26-1, as can be seen schematically at FIG. 2, and in the embodiment shown at FIG. 7. In one embodiment, the outlet angle 26-1 is defined as the general or average angle of an inner surface 26a of the outlet port 26, for example as shown at FIG. 8. In one embodiment, the outlet angle 26-1 is defined as the angle of the general centerline of the outlet port 26, for example as shown at FIG. 2. In one embodiment, the outlet angle 26-1 is defined as the general resulting direction of the working fluid 12-2 leaving the rotors 30, 32 due to contact with the inner surface 26a, as can be seen at both FIGS. 2 and 8. As shown, the outlet angle 26-1 is neither perpendicular nor parallel to the rotational axes X1, X2 of the rotors 30, 32. Accordingly, the inner surface 26a of the outlet port 26 receives the leaving working fluid 12-2 from the rotors 30, 32 at an oblique angle which can reduce backpressure at the outlet port 26. In one embodiment, the inlet angle 24-1 and the outlet angle 26-1 are generally equal or parallel, as shown in FIG. 2. In one embodiment, the inlet angle 24-1 and the outlet angle 26-1 are oblique with respect to each other. It is to be understood that the outlet angle 26-1 may be generally perpendicular to axes X1, X2, although an efficiency loss may be anticipated for certain rotor configurations. It is further noted that the outlet angle 26-1 may be perpendicular to the axes X1, X2. As configured, the orientation and size of the outlet port 26-1 are established such that the leaving working fluid 12-2 can evacuate each rotor cavity 28 as easily and rapidly as possible so that backpressure is reduced as much as possible. The output power of the shaft 38 is maximized to the extent that backpressure caused by the outlet can be minimized such that the working fluid can be rapidly discharged into the lower pressure working fluid at the condenser.

The efficiency of the expander 20 can be optimized by coordinating the geometry of the inlet angle 24-1 and the geometry of the rotors 30, 32. For example, the helix angle HA of the rotors 30, 32 and the inlet angle 24-1 can be configured together in a complementary fashion. Because the inlet port 24 introduces the working fluid 12-1 to both the leading and trailing faces of each rotor 30, 32, the working fluid 12-1 performs both positive and negative work on the expander 20.

To illustrate, FIG. 3 shows that lobes 30-1, 30-4, 32-1, and 32-2 are each exposed to the working fluid 12-1 through the inlet port opening 24b. Each of the lobes has a leading surface and a trailing surface, both of which are exposed to the working fluid at various points of rotation of the associated rotor. The leading surface is the side of the lobe that is forward most as the rotor is rotating in a direction R1, R2 while the trailing surface is the side of the lobe opposite the leading surface. For example, rotor 30 rotates in direction R1 thereby resulting in side 30-1a as being the leading surface of lobe 30-1 and side 30-1b being the trailing surface. As rotor 32 rotates in a direction R2 which is opposite direction R1, the leading and trailing surfaces are mirrored such that side 32-2a is the leading surface of lobe 32-2 while side 32-2b is the trailing surface.

In generalized terms, the working fluid 12-1 impinges on the trailing surfaces of the lobes as they pass through the inlet port opening 24*b* and positive work is performed on each rotor 30, 32. By use of the term positive work, it is meant that the working fluid 12-1 causes the rotors to rotate in the desired direction: direction R1 for rotor 30 and direction R2 for rotor 32. As shown, working fluid 12-1 will operate to impart positive work on the trailing surface 32-2*b* of rotor 32-2, for example on surface portion 47. The working fluid 12-1 is also imparting positive work on the trailing surface 30-4*b* of rotor 30-1, for example of surface portion 46. However, the working fluid 12-1 also impinges on the leading surfaces of the lobes, for example surfaces 30-1 and 32-1, as they pass through the inlet port opening 24*b* thereby causing negative work to be performed on each rotor 30, 32. By use of the term negative work, it is meant that the working fluid 12-1 causes the rotors to rotate opposite to the desired direction, R1, R2.

Accordingly, it is desirable to shape and orient the rotors 30, 32 and to shape and orient the inlet port 24 such that as much of the working fluid 12-1 as possible impinges on the trailing surfaces of the lobes with as little of the working fluid 12-1 impinging on the on the leading lobes such that the highest net positive work can be performed by the expander 20.

One advantageous configuration for optimizing the efficiency and net positive work of the expander 20 is a rotor lobe helix angle HA of about 35 degrees and an inlet angle 24-1 of about 30 degrees. Such a configuration operates to maximize the impingement area of the trailing surfaces on the lobes while minimizing the impingement area of the leading surfaces of the lobes. In one embodiment, the helix angle is between about 25 degrees and about 40 degrees. In one embodiment, the inlet angle 24-1 is set to be within (plus or minus) 15 degrees of the helix angle HA. In one embodiment, the helix angle is between about 25 degrees and about 40 degrees. In one embodiment, the inlet angle 24-1 is set to be within (plus or minus) 15 degrees of the helix angle HA. In one embodiment, the inlet angle is within (plus or minus) 10 degrees of the helix angle. In one embodiment, the inlet angle 24-1 is set to be within (plus or minus) 5 degrees of the helix angle HA. In one embodiment, the inlet angle 24-1 is set to be within (plus or minus) fifteen percent of the helix angle HA while in one embodiment, the inlet angle 24-1 is within ten percent of the helix angle. Other inlet angle and helix angle values are possible without departing from the concepts presented herein. However, it has been found that where the values for the inlet angle and the helix angle are not sufficiently close, a significant drop in efficiency (e.g. 10-15% drop) can occur.

Rankine Cycle Operation

Figure 4:
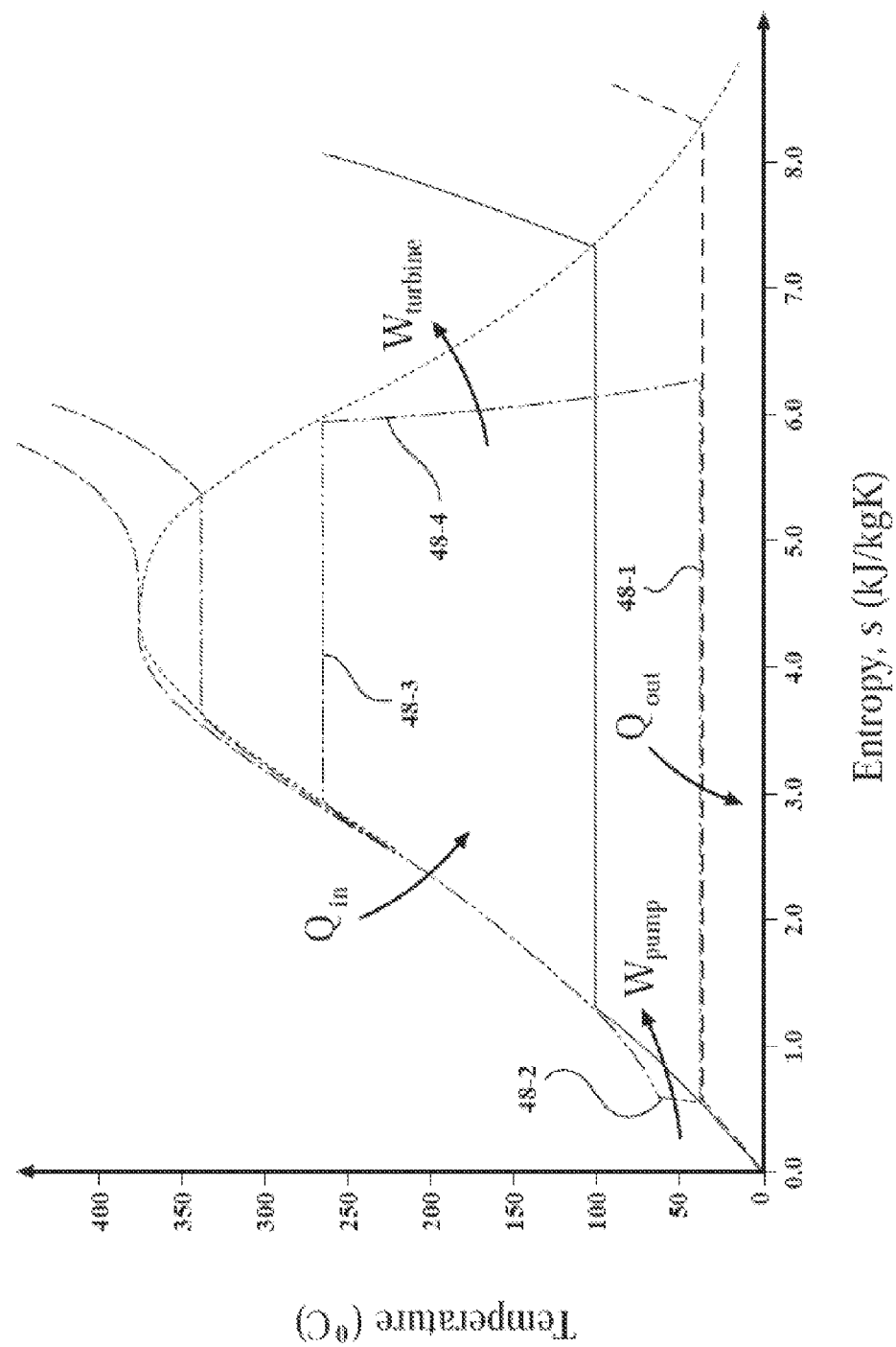
FIG. 4 is a diagram depicting the Rankine cycle employed by the system shown in FIG. 1.

FIG. 4 shows a diagram 48 depicting a representative Rankine cycle applicable to the system 10, as described with respect to FIG. 1. The diagram 48 depicts different stages of the Rankine cycle showing temperature in Celsius plotted against entropy "S", wherein entropy is defined as energy in kilojoules divided by temperature in Kelvin and further divided by a kilogram of mass (kJ/kg*K). The Rankine cycle shown in FIG. 4 is specifically a closed-loop Organic Rankine Cycle (ORC) that may use an organic, high molecular mass working fluid, with a liquid-vapor phase change, or boiling point, occurring at a lower temperature than the water-steam phase change of the classical Rankine cycle. Accordingly, in the system 10, the working fluid 12 may be a solvent, such as ethanol, n-pentane or toluene.

In the diagram 48 of FIG. 4, the term "$\dot{Q}$" represents the heat flow to or from the system 10, and is typically expressed in energy per unit time. The term "$\dot{W}$" represents mechanical power consumed by or provided to the system 10, and is also typically expressed in energy per unit time. As may be additionally seen from FIG. 4, there are four distinct processes or stages 48-1, 48-2, 48-3, and 48-4 in the ORC. During stage 48-1, the working fluid 12 in the form of a wet vapor enters and passes through the condenser 14, in which the working fluid is condensed at a constant temperature to become a saturated liquid. Following stage 48-1, the working fluid 12 is pumped from low to high pressure by the pump 16 during the stage 48-2. During stage 48-2, the working fluid 12 is in a liquid state.

From stage 48-2 the working fluid is transferred to stage 48-3. During stage 48-3, the pressurized working fluid 12 enters and passes through the heat exchanger 18 where it is heated at constant pressure by an external heat source to become a two-phase fluid, i.e., liquid together with vapor. From stage 48-3 the working fluid 12 is transferred to stage 48-4. During stage 48-4, the working fluid 12 in the form of the two-phase fluid expands through the expander 20, generating useful work or power. The expansion of the partially vaporized working fluid 12 through the expander 20 decreases the temperature and pressure of the two-phase fluid, such that some additional condensation of the two-phase working fluid 12 may occur. Following stage 48-4, the working fluid 12 is returned to the condenser 14 at stage 48-1, at which point the cycle is then complete and will typically restart.

Typically a Rankine cycle employs a turbine configured to expand the working fluid during the stage 48-4. In such cases, a practical Rankine cycle additionally requires a superheat boiler to take the working fluid into superheated range in order to remove or evaporate all liquid therefrom. Such an additional superheating process is generally required so that any liquid remaining within the working fluid will not collect at the turbine causing corrosion, pitting, and eventual failure of the turbine blades. As shown, the ORC of FIG. 4 is characterized by the absence of such a superheat boiler and the attendant superheating process needed to evaporate all liquid from the working fluid. The preceding omission is permitted by the fact that the expander 20 is configured as a twin interleafed rotor device which is not detrimentally impacted by the presence of a liquid in the working fluid 12. Furthermore, the expander 20 benefits from the presence of such a liquid, primarily because the remaining liquid tends to enhance the operational efficiency of the expander by sealing clearances between the first and second rotors 30, 32, and between the rotors and the housing 22. Accordingly, when useful work is generated by the expander 20 in the system 10, the working fluid 12 within the expander is present in two phases, i.e., as a liquid-vapor, such that conversion efficiency of the ORC is increased. However, it is to be understood that the recovery device 20 can be used in configurations involving a superheated gas.

Additionally, a smaller size expander may be used in the system 10 to achieve the required work output. The efficiency will never be above the Carnot efficiency of 63% because that is the maximum Caarnot efficiency eff=1−Tcold/Thot. The working fluid will likely be ethanol which has a max temp of 350 c before it starts to break down. The expander efficiency will be less than the peak efficiency of a turbo but the efficiency islands are considerably larger over a greater flow range then than the turbo expander so an overall efficiency for a cycle is larger.

Figure 5:
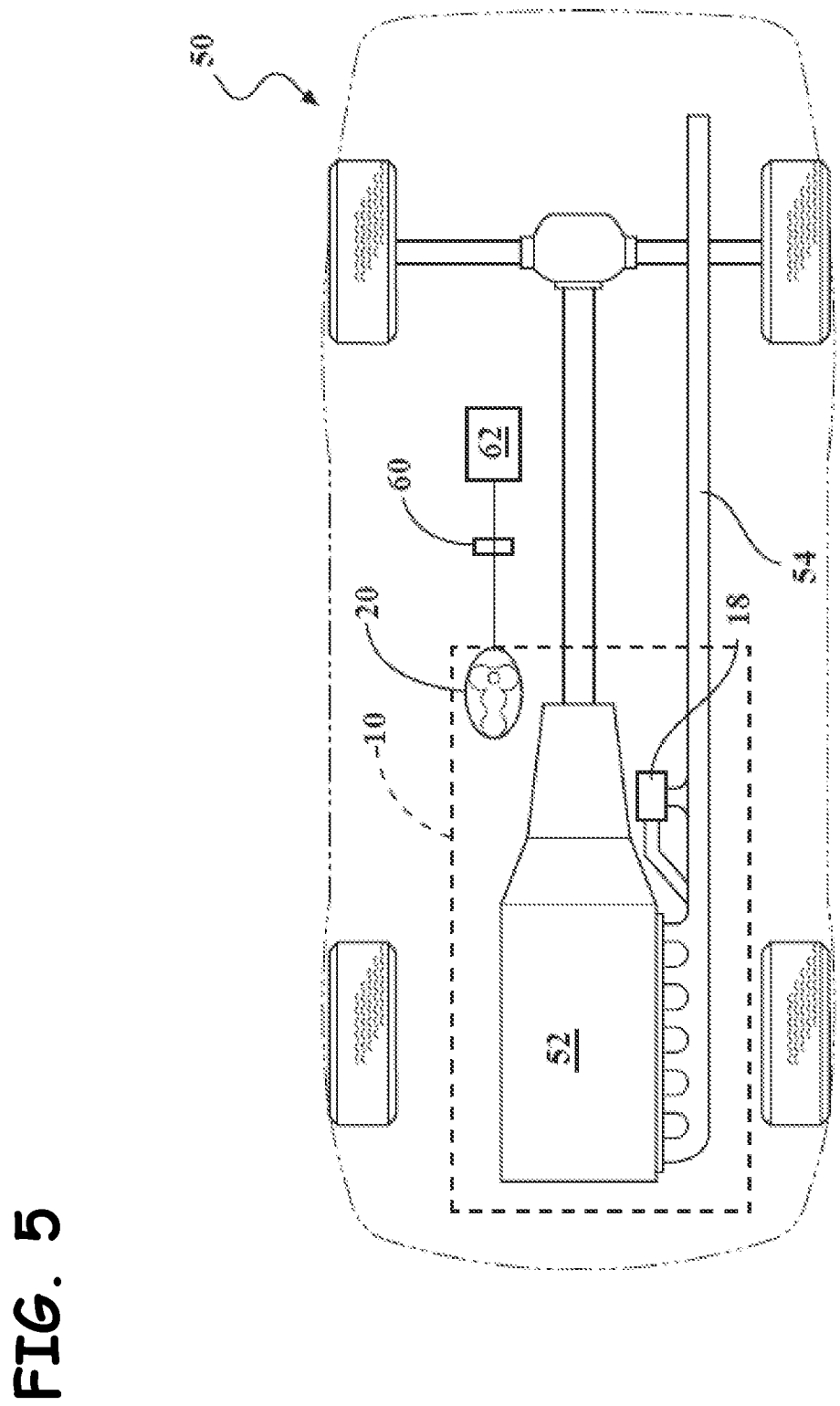
FIG. 5 is a schematic depiction of the system shown in FIG. 1 being used in a vehicle having an internal combustion (IC) engine as a vehicle power-plant.
Figure 6:
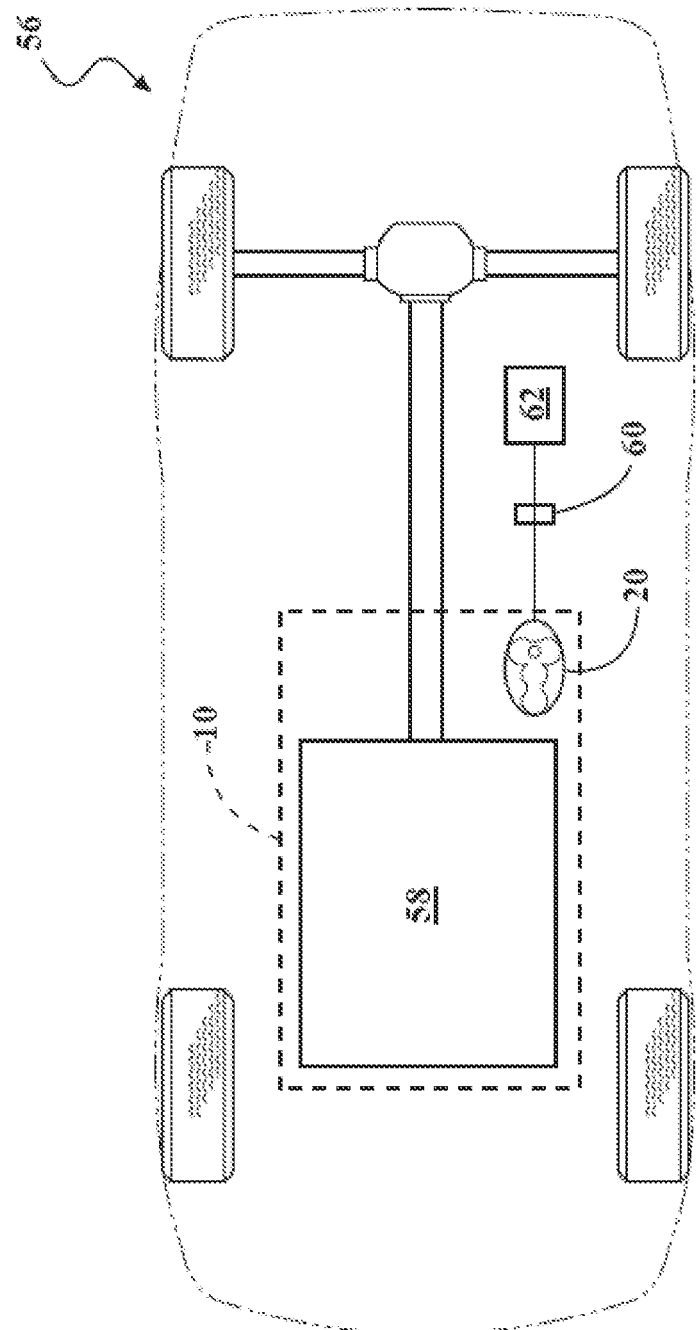
FIG. 6 is a schematic depiction of the system shown in FIG. 1 being used in a vehicle having a fuel cell as a vehicle power-plant.

As shown in FIG. 5, the system 10 may be used in a vehicle 50 having an internal combustion (IC) engine 52 as a vehicle power-plant. As shown, the IC engine 52 includes an exhaust system 54. The exhaust system 54 may further include an exhaust gas recirculation (EGR) feature. According to the present disclosure, the EGR of the exhaust system 54 may operate as the heat exchanger 18 of the Rankine cycle of the system 10. Additionally, as shown in FIG. 6, the system 10 may be used in a vehicle 56 that includes a fuel cell 58 such as a solid oxide fuel cell configured to operate as the vehicle power-plant. Each of the vehicles shown in FIGS. 5 and 6 may directly connect the work energy through a pulley or gear drive 19 or may include a load storage device 60, such that the work generated by the expander 20 may be accumulated in the load storage device 60 for subsequent release on demand. It is also noted that the load storage device 60 may be an accumulator wherein the recovery device 20 provided shaft power to a pump or other type of device known in the art.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A system used to generate useful work via a closed-loop Rankine cycle, the system comprising:
    a condenser configured to condense a working fluid;
    a fluid pump configured to pressurize the working fluid;
    a heat exchanger configured to heat the working fluid; and
    a volumetric fluid expander configured to receive the working fluid from the heat exchanger, generate the work, and transfer the working fluid to the condenser, the expander including:
        a housing having an inlet port configured to admit relatively high-pressure working fluid and an outlet port configured to discharge into relatively low-pressure working fluid;
        first and second twisted non-contacting meshed rotors rotatably disposed in the housing and configured to expand the relatively high-pressure working fluid into the relatively low-pressure working fluid, wherein the first rotor has a first plurality of lobes and the second rotor has a second plurality of lobes equal in number to the first plurality of lobes, and wherein a volume defined between the interior side of the housing and adjacent lobes of the first and second plurality of lobes is constant as the working fluid respectively traverses the length of the rotating first and second rotors; and
        an output shaft operatively connected to one of the first and second rotors and rotated by the working fluid as the working fluid undergoes expansion.

2. The system of claim 1, being characterized by the absence of a superheat boiler provided to take the working fluid into superheated range and evaporate all liquid from the working fluid.

3. The system of claim 2, wherein when useful work is generated during the Rankine cycle, the working fluid is present in two phases within the expander, such that conversion efficiency of the Rankine cycle is increased via the working fluid sealing internal clearances between the first and second rotors, and between the rotors and the housing.

4. The system of claim 1, wherein the system is used in a vehicle having an internal combustion engine with an exhaust system, and wherein the heat exchanger is in fluid communication with the exhaust system.

5. The system of claim 1, wherein the system is used in a vehicle having a solid oxide fuel cell.

6. The system of claim 1, further comprising a load storage device, wherein the mechanical work generated by the expander is accumulated in the load storage device for subsequent release on demand.

7. The system of claim 6, wherein the load storage device is one of an pneumatic accumulator, a hydraulic accumulator, and an electric battery.

8. The system of claim 1, wherein the expander includes first and second meshed timing gears fixed relative to the first and second meshed rotors, respectively, that are configured to prevent contact between the rotors.

9. A volumetric fluid expander configured to transfer a working fluid and generate useful work, the expander comprising:
    a housing having an inlet port configured to admit relatively high-pressure working fluid and an outlet port configured to discharge into relatively low-pressure working fluid;
    first and second twisted non-contacting meshed rotors rotatably disposed in the housing and configured to expand the relatively high-pressure working fluid into the relatively low-pressure working fluid, wherein each rotor has a plurality of lobes defining a helix angle and a twist angle, wherein the first rotor has a first plurality of lobes and the second rotor has a second plurality of lobes equal in number to the first plurality of lobes, and wherein a volume defined between the interior side of the housing and adjacent lobes of the first and second plurality of lobes is constant as the working fluid respectively traverses the length of the rotating first and second rotors; and
    an output shaft having a rotational axis that is configured to be rotated by the relatively high-pressure working fluid as the working fluid undergoes expansion;
    wherein the helix angle is between 25 degrees and 40 degrees and a twist angle between 120 degrees and 160 degrees.

10. The fluid expander of claim 9, wherein the inlet port has an inlet angle of 30 degrees.

11. The fluid expander of claim 9, wherein the helix angle is 35 degrees.

12. The fluid expander of claim 10, wherein the helix angle is 35 degrees.

13. The fluid expander of claim 9, wherein the inlet angle is oblique with respect to a rotational axis of the output shaft.

14. The fluid expander of claim 9, wherein the outlet port is includes an outlet angle that is oblique with respect to a longitudinal axis of the rotors.

15. An energy recovery system:
    a power source that generates a waste heat stream, the power source having a power input location;
    a volumetric energy recovery device configured to transfer energy from the waste heat stream to the power input location, the volumetric energy recovery device including:
        a housing having an inlet port and an outlet port;
        first and second twisted non-contacting meshed rotors in fluid communication with the inlet and outlet ports, the rotors being rotatably disposed in the housing wherein a first rotational axis of the first twisted rotor is parallel to a second rotational axis of the second twisted rotor, wherein the first rotor has a first plurality of lobes and the second rotor has a second plurality of lobes equal in number to the first plurality of lobes, and wherein a volume defined between the interior side of the housing and adjacent lobes of the first and second plurality of lobes is constant as the working fluid respectively traverses the length of the rotating first and second rotors;

an output shaft operatively connected to one of the first and second rotors and to the power input location of the power source, the output shaft being rotated by power from the waste heat stream.

16. The energy recovery system of claim 15, wherein the waste heat stream is in fluid communication with a working fluid and wherein the working fluid is in fluid communication with the volumetric energy recovery device via the inlet and outlet ports.

17. The energy recovery system of claim 15, wherein the working fluid is an organic fluid.

18. The energy recovery system of claim 17, wherein the working fluid is subjected to a Rankine cycle in which at least a portion of the working fluid is expanded from a liquid state to a vapor state within the energy recovery device.

19. The energy recovery system of claim 15, wherein the power source is an internal combustion engine and the waste heat stream is an engine exhaust stream.

20. The energy recovery system of claim 15, wherein the power input location is a load storage device.

21. The energy recovery system of claim 20, wherein the load storage device is a battery.

22. The energy recovery system of claim 15, wherein the power input location is an engine drive shaft.

* * * * *